United States Patent [19]  [11] 3,867,436
Nakamura et al. [45] Feb. 18, 1975

[54] METHOD OF PREPARING PHENYLALANINE

[75] Inventors: Masao Nakamura, Kawasaki; Chieko Uchida, Yokosuka; Masanao Ozaki, Kawasaki; Takehiko Ichikawa, Fujisawa, all of Japan

[73] Assignee: Ajinomoto Co., Inc., Tokyo, Japan

[22] Filed: July 9, 1973

[21] Appl. No.: 377,285

[52] U.S. Cl. ............................................. 260/518 R
[51] Int. Cl. ........................................... C07c 101/08
[58] Field of Search ................................. 260/518 R

[56] References Cited
OTHER PUBLICATIONS

Greenstein, J. P. et al., Chemistry of the Amino Acids, Vol. I (1961), Pub. by John Wiley & Sons of N. Y. (QP801A5G7) Pages 698–700 relied on.

Primary Examiner—Lorraine A. Weinberger
Assistant Examiner—L. A. Thaxton
Attorney, Agent, or Firm—Hans Berman; Kurt Kelman

[57] ABSTRACT

Phenylalanine is produced in excellent yields by simultaneous reaction of phenylacetaldehyde with ammonium and cyanide ions in an aqueous medium containing at least one mole free ammonia per mole phenylacetaldhyde and an amount of a watermiscible, inert, organic solvent at least twice the weight of the phenylacetaldehyde, and subsequent acid or alkaline hydrolysis of the amino nitrile formed. When the initial reaction mixture contains carbonate ions, the corresponding hydantoin derivative is formed as an intermediate instead of the amino nitrile.

7 Claims, No Drawings

METHOD OF PREPARING PHENYLALANINE

This invention relates to a method of preparing phenylalanine, and particularly to a method of preparing phenylalanine from phenylacetaldehyde.

Phenylalanine is one of the amino acids essential in human nutrition and an intermediate in the synthesis of $\alpha$-aspartylphenylalanine methyl ester which is a known sweetener.

Phenylalanine was first synthesized by Fischer from $\alpha$-bromo-$\beta$-phenylpropionic acid (Ber. 37 [1904] 3064). More recently, it has been prepared from the condensation product of benzyl chloride with an acetaminomalonic acid ester by saponification and decarboxylation, and from the condensation product of benzaldehyde and hydantoin by hydrogenation and hydrolysis. None of these methods is useful for producing phenylalanine on an industrial scale because of a complex sequence of reactions, a low yield, and/or costly starting materials. Phenylalanine has therefore been produced commercially from proteins or by microbial synthesis.

It has now been found that pheylacetaldehyde, under certain conditions, can be reacted with ammonium and cyanide ions in an aqueous medium, and that the intermediate so formed is readily hydrolyzed to phenylalanine.

Strecker's synthesis of $\alpha$-amino acids by simultaneous reaction of aldehydes with ammonia and hydrogen cyanide and subsequent hydrolysis of the amino nitrile formed as an intermediate was not practical heretofore for the synthesis of phenylalanine. Because of the presence of a methylene group activated by the adjacent phenyl and formyl groups, phenylacetaldehyde readily polymerizes in the presence of acids or alkalis, or at elevated temperature. When an attempt is made to produce the corresponding amino nitrile under the conventional conditions of Strecker's reaction, only a small amount of phenylalanine can be recovered from the reaction mixture, and most of the phenylacetaldehyde is converted into an oily material. When carbonate ions are initially present in the reaction mixture, the intermediate is a hydantoin derivative, but no improvement in yield is achieved.

It has now been found that phenylacetaldehyde can be converted to phenylalanine with yields closely approaching 100% if the aqueous medium in which the simultaneous reaction of 1 mole phenylacetaldehyde with respective mole-equivalents of ammonium and cyanide ions is performed contains a water-miscible organic solvent in an amount of at least twice the weight of the phenylacetaldehyde, and further contains free ammonia in an amount at least equimolecular to the phenylacetaldehyde. No oily by-product is formed. Because phenylacetaldehyde is available by isomerization of styrene oxide, the invention provides synthetic phenylalanine at low cost.

In carrying out the method of the invention, and aqueous solution of the reactants and the organic solvent is prepared in any desired manner, and the solution is held at elevated temperature, preferably 50° to 250°C, until the desired intermediate, an amino nitrile or the corresponding hydantoin derivative is formed. The intermediate thereafter may be hydrolyzed in any conventional manner, and the phenylalanine recovered from the hydrolysis mixture.

Inert, water-miscible organic solvents which are readily available and inert to the reactants and the reaction products include the lower alkanols, particularly methanol, ethanol, isopropanol, or n-propanol, the corresponding diols and polyols, particularly ethyleneglycol and glycerol, and cyclic ethers such as tetrahydrofuran and dioxane. Methanol and ethanol are most economically employed at this time.

The beneficial effects of the water-miscible solvent are achieved when the weight of the solvent in the aqueous medium is at least twice the weight of the phenylacetaldehyde, but at least 4 times the weight of the phenylacetaldehyde is preferred, and no further improvement is observed when the solvent is used in an amount which is more than 8 times the weight of the phenylacetaldehyde.

Because of the need for free ammonia or ammonium hydroxide in the reaction system, the preferred sources of ammonium ions are ammonia and ammonium cyanide. The free ammonia present in the reaction medium is thought to form an aldehyde-ammonia compound with the phenylacetaldehyde which is more readily soluble in the mixture of water and organic solvent that the aldehyde itself and to account for the favorable results.

Any water-soluble and ionized cyanide may be employed as a source of cyanide ions. From a practical point of view, hydrogen cyanide, ammonium cyanide, and the alkali metal cyanides, more specifically sodium and potassium cyanide, are preferred.

The source of carbonate ions employed for forming an intermediate hydantoin derivative is equally non-critical, but the carbonates and bicarbonates of sodium, potassium, or ammonium are preferred, and may be formed in the reaction mixture from carbon dioxide. The source of carbonate ions should be employed in an equimolecular amount based on the phenylacetaldehyde or in a slight excess. Using more than 1.1 moles carbonate ion per mole of phenylacetaldehyde has no measurable effect on the yield.

The sequence in which the reactants are dissolved in the water and organic solvent is immaterial,* and the concentration of the reactants in the aqueous medium has no major effect on the outcome. The phenylacetaldehyde concentration is limited by solubility and dilute solutions are costlier to handle. Thus the phenylacetaldehyde concentration should be between 0.1 and 2.0 moles per liter, and it is generally most advantageous to hold it between 0.3 and 1.0 mole per liter.

*but the phenylacetaldehyde is preferably dissolved in a solution containing other reactants.

The intermediate may be hydrolyzed to phenylalanine by any conventional method. Complete hydrolysis is normally achieved at about 100°C in 3 to 5 hours under refluxing conditions, or at 150° to 200°C in a closed vessel in less than 1 hour to a few minutes in the presence of an acid (hydrochloric, sulfuric acid) or alkali(alkali metal or alkaline earth metal hydroxide). Residual ammonia in the reaction mixture may be effective as a hydrolysis catalyst. The ammonia, carbon dioxide formed by hydrolysis of the hydantoin derivative, and the organic solvent may be recovered from the hydrolysis mixture. It is not normally necessary nor useful to isolate the intermediate amino nitrile or hydantoin derivative.

Phenylalanine is readily crystallized from the hydrolysis mixture stripped of volatile ingredients and some water by pH adjustment.

The following Examples are further illustrative of this invention.

EXAMPLE 1

Gaseous hydrogen cyanide was absorbed in an aqueous 10-molar ammonium hydroxide solution in an amount of 2 moles per liter. 14.3 g Ammonium carbonate monohydrate was dissolved in 75 ml of the ammoniacal ammonium cyanide solution so prepared, and a solution of 12.0 g phenylacetaldehyde in 60 g ethanol was added. The mixture was held in an autoclave at 120°C for 30 minutes, and was then cooled. 20 g Sodium hydroxide was added, the autoclave was sealed again and held at 200°C for 30 minutes. Nitrogen present in the reaction mixture as amine was determined by the Van Slyke method and indicated a phenylalanine yield of 98.7%.

The reaction mixture was partly evaporated in a vacuum, and the concentrate was neutralized with hydrochloric acid. Phenylalanine crystallized and was filtered off. 16.3 g Crystalline phenylalanine having a purity of 93.4% was recovered (92.7% yield, based on phenylacetaldehyde). When recrystallized from water, the product melted at 271° to 273°C. It was further identified by its infrared absorption spectrum and by the unchanged melting point of its mixtures with a known sample of DL-phenylalanine. A paper chromatogram developed with n-propanol/28% ammonia water/ water 20/12/31 gave a single spot at Rf 0.70.

EXAMPLE 2

Gaseous hydrogen cyanide was absorbed in an aqueous, 5-molar ammonium hydroxide solution in an amount of 2 moles per liter, and 4.11 g ammonium carbonate monohydrate was dissolved in 18 ml of the ammoniacal ammonium cyanide solution. A solution of 3.6 g phenylacetaldehyde in 18 g methanol was added, and the mixture was held at 120°C for 30 minutes, thereafter at 200°C for 30 minutes in the presence of 3.9 g sodium hydroxide, substantially as in Example 1.

The hydrolysis mixture was analyzed for amine nitrogen content, and a phenylalanine yield of 95.7% was calculated. The product was recovered and identified as in Example 1.

A yield of 91.8%, based on amine nitrogen, was obtained when the methanol was replaced by an equal weight of dioxane.

EXAMPLE 3

8.6 g Phenylacetaldehyde was dissolved with stirring in a solution prepared from 3.5 g hydrogen cyanide, 5.4 g ammonium bicarbonate, 9.0 g ammonia, 50 g methanol, and 72 g water. The mixture was held at 102°C for 30 minutes in an autoclave, and thereafter at 200°C for 30 minutes for hydrolyzing the intermediate formed.

As determined by the Van Slyke method, it then contained phenylalanine in a yield of 96.0% based on phenylacetaldehyde.

EXAMPLE 4

For comparison purposes, an aqueous solution containing 5 moles ammonia and 2 moles hydrogen cyanide was prepared as in Examples 1 and 2, and 4.11 g ammonium carbonate monohydrate was dissolved in 36 ml of the ammoniacal ammonium cyanide solution. 3.6 g Phenylacetaldehyde was added, and the mixture was held at 120°C for 30 minutes in an autoclave.

After cooling, the autoclave was opened, and an oily material was removed. The aqueous mixture was further worked up as in Example 1. The hydrolysis mixture was found by the Van Slyke method to contain phenylalanine in an amount corresponding to 24.9% of the phenylacetaldehyde employed.

EXAMPLE 5

For further comparison, 3.6 g phenylacetaldehyde dissolved in 18 g methanol was added to a solution of 1.76 g sodium cyanide and 4.11 g ammonium carbonate monohydrate in 18 ml water. The mixture was held at 120°C for 30 minutes in an autoclave.

After cooling, the autoclave was opened, and an oily material was removed. The aqueous remainder was further treated as in Example 1, and the hydrolysis mixture contained phenylalanine in an amount corresponding to 18.8% of the phenylacetaldehyde, as calculated from the results of a nitrogen determination by the Van Slyke method.

As is evident from Examples 4 and 5, neither an organic, water-miscible solvent alone nor the presence of free ammonia in the reaction mixture can bring about the high phenylalanine yields readily available by the method of the invention.

Similar, though not quite as favorable results are achieved in the absence of carbonate ions when an amino nitrile is formed as the intermediate.

While the invention has been described with particular reference to specific embodiments, it is to be understood that it is not limited thereto but is to be construed broadly and restricted solely by the scope of the appended claims.

What is claimed is:
1. A method preparing phenylalanine which comprises:
    a. Maintaining the temperature of a solution of phenylacetaldehyde, ammonium ions, cyanide ions, and free ammonia in an aqueous medium between 50°C and 150°C until one mole of said phenylacetaldehyde simultaneously reacts with one mole-equivalent each of said cyanide and ammonium ions to form an aminonitrile intermediate,
        1. said medium containing a water-miscible, organic solvent inert to said phenylacetaldehyde, said ammonia, and said cyanide ions in an amount equal to at least twice the weight of said phenylacetaldehyde,
        2. the amount of said free ammonia being at least one mole per mole of said phenylacetaldehyde; and
    b. hydrolyzing said intermediate to phenylalanine.
2. A method as set forth in claim 1, wherein said solution contains between 0.1 and 2. moles phenylacetaldehyde per liter.
3. A method as set forth in claim 2, wherein the amount of said phenylacetaldehyde in said solution is between 0.3 and 1.0 mole per liter.
4. A method as set forth in claim 1, wherein the amount of said organic solvent is between four and eight times the weight of said phenylacetaldehyde, and the amount of said free ammonia is between 2 and 8 moles per mole of said phenylacetaldehyde.
5. A method as set forth in claim 4, wherein said organic solvent is an alchol or an ether.

6. A method as set forth in claim 1, wherein said medium additionally contains at least one mole-equivalent of carbonate ions per mole of said phenylacetaldehyde.

7. A method as set forth in claim 6, wherein the amount of said carbonate ions is not greater than approximately 1.1 mole-equivalents per mole of said phenylacetaldehyde.

* * * * *